United States Patent [19]

Morrow

[11] Patent Number: 4,667,455
[45] Date of Patent: May 26, 1987

[54] METHOD AND APPARATUS FOR SEALING CAPSULES

[76] Inventor: John A. Morrow, 5271 Wendover Rd., Yorba Linda, Calif. 92686

[21] Appl. No.: 704,265

[22] Filed: Feb. 22, 1985

Related U.S. Application Data

[63] Continuation of Ser. No. 452,017, Dec. 21, 1982, abandoned.

[51] Int. Cl.⁴ .............................................. B65B 7/28
[52] U.S. Cl. .................................... 53/471; 53/478; 53/281; 53/329; 53/900; 156/69
[58] Field of Search ................. 53/272, 454, 468, 477, 53/478, 560, 131, 266 R, 329, 331, 334, 366, 486, 488, 489, 281, 471, 900; 156/69, 73.1, 73.5, 294, 423, 580, 580.1; 206/528, 530; 228/2; 264/68, 69, 248, 249; 425/804

[56] References Cited

U.S. PATENT DOCUMENTS

| | | |
|---|---|---|
| 2,738,827 | 3/1956 | Roll ....................... 53/131 |
| 3,840,168 | 10/1974 | Searle et al. ............. 228/2 |
| 3,860,468 | 1/1975 | Scherer ................... 156/73.5 |
| 4,163,354 | 8/1979 | Austin ..................... 53/582 X |
| 4,325,761 | 4/1982 | Pace ........................ 156/69 |
| 4,352,711 | 10/1982 | Toth ........................ 228/2 X |
| 4,403,461 | 9/1983 | Goutand et al. ........ 53/383 X |
| 4,470,868 | 9/1984 | MacLaughlin et al. ........... 228/2 X |

OTHER PUBLICATIONS

Marks' Standard Handbook for Mechanical Engineers, Eighth Edition, pp. 5-82.

Primary Examiner—Robert L. Spruill
Assistant Examiner—Steven P. Weihrouch
Attorney, Agent, or Firm—Jackson & Jones

[57] ABSTRACT

Disclosed is a method and apparatus for sealing together two generally cylindrical thermoplastic members, each having a longitudinal axis, an open end and a closed end, so that upon being joined they form a sealed capsule that may be swallowed. One capsule member may be snugly inserted into a vibrating cavity with the opened end of the member available to be filled with an active composition. The other member is placed over the first member and pushed downwardly so that the open portions of both members overlap one another. The overlapping portions of the wall members abut each other at a cylindrical interface band. Vibration causes only the overlapping wall portions of the members to rub together, thereby generating heat around the interface band. The heat, so generated, melts enough thermoplastic material at that band to produce, on cooling, a strong circular bond between both members.

30 Claims, 3 Drawing Figures

METHOD AND APPARATUS FOR SEALING CAPSULES

This is a continuation of application Ser. No. 452,017 filed on Dec. 21, 1982 now abandoned.

BACKGROUND OF THE INVENTION

1. Field of the Invention

This invention relates to a method and apparatus for making capsules containing an active medical composition which, if contaminated, would cause substantial injury or even death to a consumer. More particularly, it relates to capsules which provide a visual indication to the consumer when someone has tampered with the capsule.

2. Background of the Invention

Recently, there has been a public outcry to safeguard nonprescription medical products and similar substances. There have been instances where deranged individuals have intentionally contaminated medical products with poisons or other materials that could cause substantial injury or even death to the persons using the products. For example, capsules containing the analgesic Tylenol were poisoned with cyanide and resulted in the death of several people who consumed this poisoned product.

One way to ensure that the consumer will be warned when a capsule has been contaminated is to seal the capsule in such a way that breaking the seal would result in readily apparent structural damage to the capsule, thereby indicating that someone had tampered with the capsule. The problem, however, is to provide a simple and economical way to rapidly seal each individual capsule.

As is well known, capsules currently employed are made of two hard shell, cylindrical members, each having an open end and a closed, rounded end. These members are made of a thermoplastic material such as the gelatin, collagen. This material will dissolve when it is swallowed by the consumer, allowing the contents of the capsule to be ingested. The diameter of these members are such that one is slightly larger than the other, thereby permitting the smaller diameter member, the male member, to be inserted into the larger diameter member, the female member. In accordance with conventional practice, first the male member is filled with the correct dosage of the active composition to be consumed, and then the female member is placed on the male member and the male member is inserted into the female member to form the capsule. Although there have been several methods suggested for sealing the members together, no one has yet discovered an energy-efficient, quick, and economical way in which to do this in such a way that the overlapping wall portions are bonded together so that rupturing the bond breaks the capsule walls.

SUMMARY OF THE INVENTION

According to the method of the present invention, the one capsule member is inserted into the other member so that the members overlap telescopically, and then the members are sealed by moving one relative to the other very rapidly to generate heat by friction to cause the overlapping surface portions of the walls of the members to melt. The relative movement is stopped when sufficient heat has been generated to melt enough thermoplastic material to produce, on cooling, a strong bond between the members, but prior to generating excess heat that would damage the structural integrity of the members. The bond between the members is sufficiently strong so that rupture of the bond provides a readily apparent break in the walls of the members that indicates that someone has tampered with the capsule. Preferably, one member is moved reciprocally relative to the other member in a direction generally along the longitudinal axis of the members. This reciprocal movement is generally in the vertical direction, and the frequency is from about 5 kilohertz to about 1 megahertz. The most preferred frequency is 50 kilohertz. At this frequency, the duration of movement is on the order of a few microseconds. The duration ordinarily does not exceed two seconds and, in most instances, is substantially less than one second. The amplitude of the vibration typically is one micron or less.

The apparatus for sealing the capsule members together comprises means for holding one member securely, this holding means being mounted to vibrate, and means for vibrating the holding means. Preferably, the holding means comprises a rigid mass having a shallow cavity therein which receives the one capsule member to be vibrated. When the member is inserted into this cavity, it fits snug within the cavity which holds this member securely. A portion, corresponding to the overlapping wall portion of the member, extends from the cavity. A second holding means may be provided for the other capsule member. When the two members are joined together telescopically, this second holding means rests on top of the capsule members. The second holding means prevents upward axial movement of the top member, usually the female member, during vibration. In some configurations, this second holding means is unnecessary.

The method and apparatus for sealing capsules of this invention has several advantages. First, the capsule can be sealed very rapidly, and the apparatus which accomplishes the sealing can be installed readily in conventional capsule filling equipment. Only a relatively small amount of energy is used to accomplish the sealing, and the capsule itself is not structurally weakened. And most importantly, a strong bond between the members is provided, and when the seal is broken, the walls of the capsule are structurally damaged, indicating that someone has tampered with the capsule.

BRIEF DESCRIPTION OF THE DRAWING

The features of the present invention can best be understood, together with the advantages discussed above and other advantages, by reference to the following description taken in connection with the drawing.

DETAILED DESCRIPTION OF THE DRAWING

Figure 1:
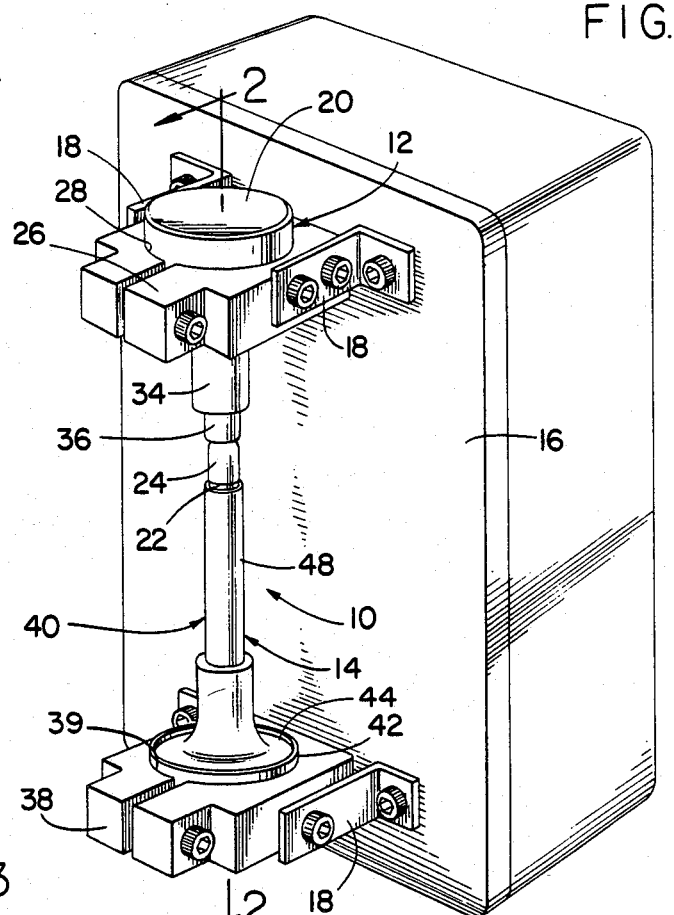
FIG. 1 is a perspective view of the apparatus of this invention for sealing capsules.

As shown in the Figures, the apparatus 10 of this invention has two main sections: head section 12 and vibrator section 14. These sections are mounted on a stand 16 by brackets 18 and are spaced apart from each other to enable the holding element 20 of the head section 12 to be lifted up and a capsule male member 22 inserted in the vibrator section 14. The holding element 20 is then manually lowered after the capsule male member 22 has been filled with an active composition 23, typically a powdery solid material, and covered by a female member 24.

The head section 12 consists of a seat 26 having a circular opening 28 therein, which receives the holding element 20. There is sufficient clearance between the sidewall of the opening 28 and the holding element 20 to permit the holding element to be manually moved in a vertical direction towards or away from the vibrator section 14. The seat 26 has a ledge 30 in the sidewall on which the holding element rests. The holding element includes a cylindrical body having an indentation 32 therein which engages the ledge when the holding element is inserted into the opening 28, a neck 34 which extends through the opening, and a tip 36 made of a fluorocarbon polymer such as Teflon. The tip is secured to the end of the neck, and it rests on the closed end of the female capsule member 24 when the holding element is positioned so that the indentation 32 rests on the ledge.

Figure 2:
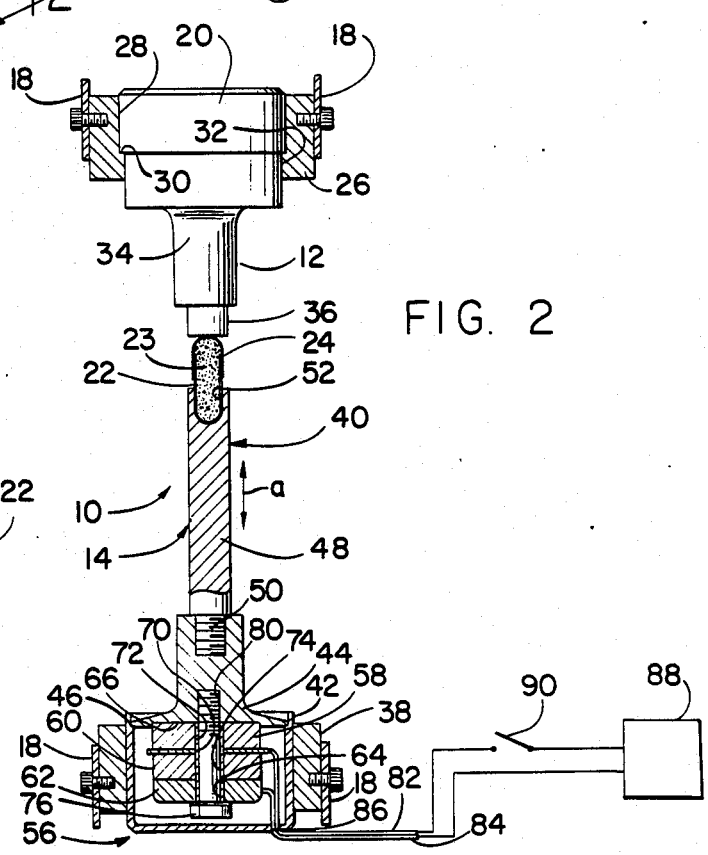
FIG. 2 is a cross-sectional view taken along line 2—2 of FIG. 1.

The vibrator section 14 includes a seat 38 having an opening 39 and a vibrator element 40 which is mounted securely within the seat. As best illustrated in FIG. 2, the vibrator element includes a cylindrical cap 42 which holds a base 44. The cap 42 fits snug within the opening 39, and it has a diameter slightly greater than the diameter of the opening. Consequently the cap does not move with respect to the seat 38.

There is a step 46 along the mouth of the cap, and the diameter of the cap's mouth, as measured between the sides of the step, is slightly less than the diameter of the base. Thus, the base is force fitted into, and held securely by, the mouth of the cap.

Figure 3:
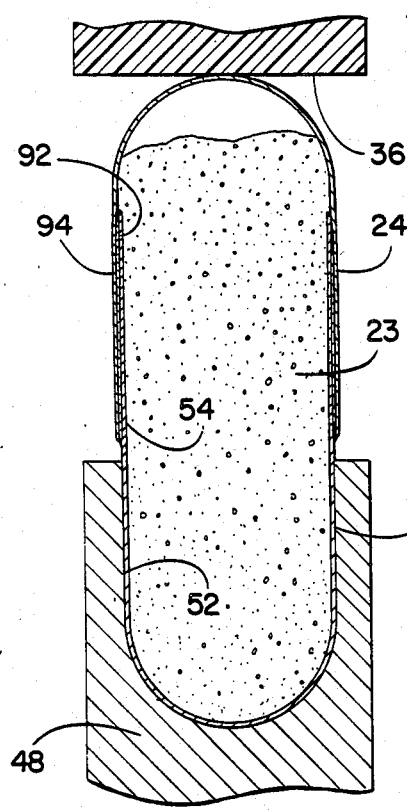
FIG. 3 is an enlarged cross-sectional view of a sealed capsule seated in the cavity of the holding means.

The base is connected to a rigid, solid rod 48 by a threaded connector 50 extending from the lower end of the rod. At the upper end of the rod is a cavity 52 which has a configuration that complements the cylindrical configuration of the male capsule member. The diameter of this cavity 52 is slightly less than the diameter of the male member 22 so that, when the male member is inserted into the cavity, it fits snug within the cavity and does not move relative to the rod. The depth of the cavity may vary between about one-half and about one-third the length of the male member. Consequently, as best shown in FIG. 3, a substantial portion 54 of the wall of the male member extends beyond the tip of the rod. This wall portion 54 corresponds to the wall portion of the male member 22 which telescopes into the female member 24 when the members are joined together as illustrated in FIG. 3.

The rod 52 is made to vibrate by means of a piezoelectric drive system 56. This system includes a pair of piezoelectric crystals 58 and 60 which expand and contract when an alternating current is applied to the crystals. The preferred piezoelectric crystals are lead zirconate, lead titanate, or barium titanate.

In accordance with conventional practice, a seismic mass 62, which has a central opening 64 therein, is employed. This mass 62 has a weight approximately equal the weight of the rod and base, and it serves to balance the apparatus 10 during vibration. The underside of the base 44 has a flat, smooth surface 66 which abuts the face of the one crystal 58. A copper plate 68, having a central opening 70 therein, separates the two crystals, each of which also has central openings 72 and 74 therein. The seismic mass 62 is secured to the crystals and base by a bolt 76 which passes through an insulation sleeve 78 and is inserted through the openings in the seismic mass, the crystals, and the plate and is threaded into a bore 80 along the longitudinal axis of the base and rod. As the bolt 76 is tightened, the seismic mass distributes the force over the faces of the crystals and plate.

A pair of wires 82 and 84 passing through a hole 86 in the bottom of the cap connects the drive system 56 to a source 88 of alternating current. The one wire 84 has one end connected to the seismic mass and its other end connected to one terminal of the source of alternating current. The other wire 82 has one end connected to the copper plate and its other end connected to a switch 90 which is connected to the other terminal of the source of alternating current.

OPERATION

To seal a capsule employing the apparatus and method of this invention, the male member 22 is first inserted into the cavity 52, with the open end exposed, and then this member is filled with an active composition 23 such as a powdered analgesic. Next, the female member 24 is placed over the male member 22 and pushed downwardly to insert the male member into the female member. Thus, the wall portion 92 of the female member 24 overlaps the wall portion 54 of the male member, and these wall portions contact only each other at the interface between them. Next, the holding element 20 is placed in the upper seat 26, with the neck 34 extending through the opening 28 in the seat and the Teflon tip 36 just resting on top of the closed end of the female member 24. The switch 90 is now closed to apply alternating current to the piezoelectric crystals 58 and 60.

When current is applied to the crystals, they rapidly expand and contract to move the rod 48 reciprocally in the axial direction as indicated by the two-headed arrow a. Specifically, expansion and contraction of the crystals causes the base 44 to act like a diaphragm, flexing inwardly and outwardly due to the fluctuations in the size of the crystals. The rod 48 consequently moves axially as the base fluctuates. The point of contact of the base with the cap, that is the perimeter of the base, acts like a hinge. The cap 42 does not vibrate to any substantial extent.

The preferred frequency of the alternating current is 50 kilohertz. Consequently, the rod 48 and associated male member 22 vibrate at a frequency of 50 kilohertz. Increasing the current will increase the amplitude of vibration. An amplitude of vibration of one micron or less is sufficient. Preferably, the rod is designed so that it will resonate at the frequency of vibration. A rod having a diameter of approximately 0.375 inch and a length of approximately 2.20 inch will so resonate at 50 kilohertz.

Because the male member 22 is held securely in the cavity 52, it moves with the rod, but the female member 24 does not follow the male member and is essentially static relative to that male member. Thus, the overlapping wall portions 54 and 92 of the members rub against each other only at the interface to frictionally produce heat that melts the thermoplastic material. The molten material is spread over essentially the entire overlapping surfaces of the wall portions 54 and 92 as a thin film 94 which, on cooling, solidifies. Solidification occurs almost instantaneously when vibration is terminated to bond the overlapping wall portions 54 and 92 together.

As the overlapping wall portions 54 and 92 of the members rub against each other to produce heat, the temperature of the air within the capsule increases and the air expands. When the capsule is full of a solid powdery composition, it usually is not necessary to place the holding member 20 on top of the closed end of the female member. Apparently the amount of gas is insufficient to blow off the female member when the gases are heated. When the male member is empty, that is only containing air, the hot gases cause the female member to move upwardly. In any event, to ensure that the female member does not move relative to the male member, the upper holding element is provided.

The switch 90 is only closed momentarily, usually less than one second. This period of vibration is sufficient to melt enough of the thermoplastic material to produce, on cooling, a strong bond between the members 22 and 24. Excess heat is not generated that would damage the structural integrity of the members. The bond between the members is sufficiently strong so that rupture of the bond provides a readily apparent break in the walls 54 and 92 of the members. This break indicates that someone has tampered with the capsule.

The above description presents the best mode contemplated of carrying out the present invention. This invention is, however, susceptible to modifications and alternate constructions from the embodiment shown in the drawing and described above. For example, vacuum means could be used to hold the members both during filling and when one is moved relative to the other. Also, though the apparatus is arranged so that the one member vibrates in the vertical direction along its longitudinal axis, it is possible in some situations that an off vertical arrangement would be desirable. Consequently, it is not the intention to limit this invention to the particular embodiment disclosed. On the contrary, the invention is to cover all modifications falling within the spirit and scope of the invention as expressed in the appended claims.

What is claimed is:

1. An apparatus for sealing together two essentially identically shaped interchangeable members of a capsule that may be swallowed, each of said members being made of a hollow cylindrical thermoplastic material and having a closed non-stepped hemispherical end continuing non-brokenly into cylindrical sidewalls which terminate at a cylindrical open end, said members each having coincidentally aligned longitudinal axes which, when said members are telescoped together over one another, form a vertical cylindrical interface frictional band between the sidewall portions thereof, said apparatus comprising:
   first means for holding, in a vertical position, one of said interchangeable member's by its closed end and with its open end and said vertical cylindrical interface band free from contact with said first holding means;
   second means for touching said second member at its closed end and free from contact with both said vertical cylindrical interface band and said first holding means;
   means for applying ultrasonic welding energy between the frictionally engaging surfaces at said interface band; and
   said energy applying means including said first holding means and ultrasonically vibrating means connected to said first holding means for vibrating said first holding means at its resonant frequency until the frictional engagement between said first and second members causes the thermoplastic to melt and form a sealed cylindrical interface band between the two capsule members.

2. The apparatus of claim 1 wherein the vibrating means moves the first holding means reciprocally in a direction generally along the longitudinal axis of the said one member.

3. The apparatus of claim 2 wherein the reciprocal movement is generally in the vertical direction.

4. The apparatus of claim 2 wherein the vibrating means vibrates the first holding means at a frequency of from about 5 kilohertz to about 1 megahertz.

5. The apparatus of claim 2 wherein the vibrating means vibrates the first holding means at a frequency of about 50 kilohertz.

6. The apparatus of claim 1 wherein the first holding means includes a shallow cavity therein which receives the said one member and, when said one member is inserted into the cavity, said cylindrical portion of the member extends from the cavity.

7. The apparatus of claim 1 wherein the vibrating means comprises piezoelectric crystal means in contact with the first holding means and a source of alternating current which is applied across the crystal means to cause vibration of said crystal means.

8. An apparatus for sealing together two capsule members, each of said members being generally identically shaped with a non-stepped hollow cylinder about a longitudinal axis, each having a closed end and an open end, and one of said members being made of a thermoplastic material and one of said members having a diameter slightly less than the diameter of the other member so that, when the open end of the smaller diameter member is inserted into the open end of the larger diameter member, a vertical cylindrical interface band between the two members is formed, said apparatus comprising:
   a rigid mass having a shallow cavity therein which receives one member, and, when said one member is inserted into the cavity, the cavity holds said one member securely with a portion of said one member including said vertical cylindrical interface band extending from the rigid mass defining the cavity,
   means for mounting said rigid mass with the cavity exposed so that said one member may be inserted into the cavity, said mounting means being adapted to vibrate reciprocally in a direction generally along the longitudinal axis of said one member,
   means for limiting axial movement of the other member during vibration of said rigid mass without contracting said vertical cylindrical interface band, and
   means for vibrating the mounting means, and said one member until the interface band, from frictional contact only between said two members, forms a sealed bond around said capsule.

9. The apparatus of claim 8 wherein the rigid mass vibrates at or near its resonant frequency.

10. The apparatus of claim 9 wherein the frequency is from about 5 kilohertz to about 1 megahertz.

11. The apparatus of claim 10 wherein the reciprocal movement is generally in the vertical direction.

12. The apparatus of claim 11 wherein the cavity has a configuration similar to the configuration of the said one capsule and is disposed in the rigid mass so that, when the said one member is inserted into the cavity, the longitudinal axis of the said one member is vertical and the open end of the said one member is exposed.

13. The apparatus of claim 12 including second holding means for holding the other member when the two members are joined together, said second holding means preventing upward axial movement of said other member during vibration.

14. The apparatus of claim 13 wherein the vibrating means is actuated after the members are joined.

15. A method of making a capsule adapted to be swallowed from two identically shaped members, each having open and closed non-stepped ends, and at least one of the members being adapted to fit snugly within the other member, comprising the steps of:

(a) filling one member while held in a vertical position with a composition, (b) telescopically joining the one member together with a vertically-positioned second member so that wall portions of the members overlap and abut each other at a cylindrical interface band formed by the overlapping wall portions of the two members.

(c) maintaining the cylindrical interface band of the overlapping wall portions of the two members in contact only with each other while vertically and vibrationally moving one member relative to the other member very rapidly to generate heat by friction to cause the interface surfaces of the thermoplastic members to melt, and (d) stopping the relative vibrational movement of the members when sufficient heat has been generated to melt enough thermoplastic material to produce on cooling a strong cylindrical interface bond between the members at the interface but prior to generating excess heat that would damage the structural integrity of the members.

16. The method of claim 15 wherein the bond between the members is sufficiently strong so that rupture of the bond provides a readily apparent break in the members that indicates that someone has tampered with the capsule.

17. The method of claim 16 wherein the time the members are moved relative to each other does not exceed two seconds.

18. The method of claim 17 wherein the time the members are moved relative to each other is less than one second.

19. The method of claim 18 wherein both members are made of a thermoplastic material.

20. The method of claim 19 wherein the thermoplastic material is collagen.

21. The method of claim 15 wherein the one vertical member is moved reciprocally relative to the other vertical member in a direction generally along the longitudinal axis of the said one member.

22. The method of claim 21 wherein the reciprocal movement is generally in the vertical direction.

23. The method of claim 22 wherein the frequency of the reciprocal movement is from about 5 kilohertz to about 1 megahertz.

24. A method for making a sealed capsule adapted to be swallowed from two members, each having opened and closed ends and made of thermoplastic material, with the two members being adapted to fit snugly at a smooth interface surface between the members, said method comprising the steps of:

placing one member in a vertical vibrational holding means with the member's open and facing upwardly and extending beyond the upper surface of the holding means;

filling said vertically-held member with a composition;

telescopically placing the other member over said one member's portion that extends above the holding mean's surface so that exposed interfacing portions of the two members overlap and abut each other in touching engagement between the two members;

maintaining the exposed interfacing portions of the two members in frictional contact only with each other;

vibrating said holding means at its resonant frequency;

vertically moving one member relative to the other member at an amplitude of about one micron at the resonant frequency;

generating heat by friction between the abutting interfacing portions of the two members in response to said vibration;

melting the thermoplastic members by the vibrational movement;

stopping the vibrational movement when the thermoplastic material has melted sufficiently to form a bond between the two members when cooled, and before the member's structural integrity is harmed;

allowing the members to cool, and forming a strong and continuous bond between the members at the interface when cooled.

25. The method of claim 24 wherein the step of vibrating is further defined by the step of:

maintaining the duration of vibration of said one member relative to said other member for a time duration not to exceed two seconds.

26. The method of claim 24 wherein the step of vibrating is further defined by the step of:

limiting the time of vibration of said one member to said other member to less than one second.

27. The method of claim 24 and comprising the additional step of:

using collagen for the thermoplastic material of said two members.

28. The method of claim 24 and comprising the additional steps of:

selecting the frequency of vibration from the frequency range of about 5 kilohertz to about 1 megahertz and matched to the resonant frequency of said one holding means, and limiting the vibrational movement to about one micron.

29. A method of making a capsule adapted to be swallowed from two collagen members each having an open end, a wall and a closed end with a bond formed between the two members which, if broken, indicates that the material enclosed within the two materials may have been tampered with, the method comprising the steps of:

selecting two identically shaped non-stepped capsule members;

vertically orienting the two members with material in one of said members snugly held in a vertical holding means adapted for vibration;

telescopically fitting one member's open end snugly over the open end of the other member;

overlapping the wall portions of both members until the members abut and interface with each other;

holding and vertically vibrating one of said two members at a frequency selected from the range of about 5 filohertz to about 1 megahertz and at the resonant frequency of said vertical holding means while limiting axial movement of the other member only until the member's wall portions melt, said holding the limiting being accomplished while the interface portions of the two members are only in contact with each other, and cooling the melted members so that a bond is formed between the two members.

30. Apparatus for making a sealed swallowable capsule from two members, each having opened and closed ends and made of thermoplastic material, with the two members being adapted to fit snugly at a smooth interface surface between the members, said apparatus comprising:

a vertical vibrational rigid holding means having a resonant frequency and adapted for holding one member's open end facing upwardly and extending beyond the upper surface of the holding means;

a composition partially filling said vertically-held member;

means for telescopically holding the other member over said one member's portion that extends above the vibrational holding mean's surface so that exposed interfacing portions of the two members overlap and abut each other in touching engagement and frictional contact only between the two members such that neither of the holding means contacts the interfacing portions of the two members;

means coupled to a lower end of said vibrational holding means for vibrating said holding means and the one member relative to the other member at a rate matching the resonant frequency of the holding means and rapid enough to generate heat by friction between the abutting interfacing portions of the two members;

said vibrating means characterized by a piezoelectric crystal means which is subjected to an operational sequence for:

(a) melting the thermoplastic members by a vibrational movement of said one of two members at a frequency selected from the range of about 5 kilohertz to about 1 megahertz and an amplitude of about a micron for a time duration not to exceed two seconds;

(b) stopping the vibrational movement when the thermoplastic material has melted sufficiently to form a bond between the two members when cooled, and before the member's structural integrity is harmed;

(c) thereafter allowing the members to cool, and forming a strong and continuous bond between the members at the interface when cooled; and (d) thereafter repeating the sequence of (a), (b) and (c) for the next capsule-forming operation.

* * * * *